Oct. 29, 1929.  A. U. WETHERBEE  1,733,324
PROCESS AND APPARATUS FOR DEFECATING LIQUID
Filed Feb. 16, 1925  3 Sheets-Sheet 2
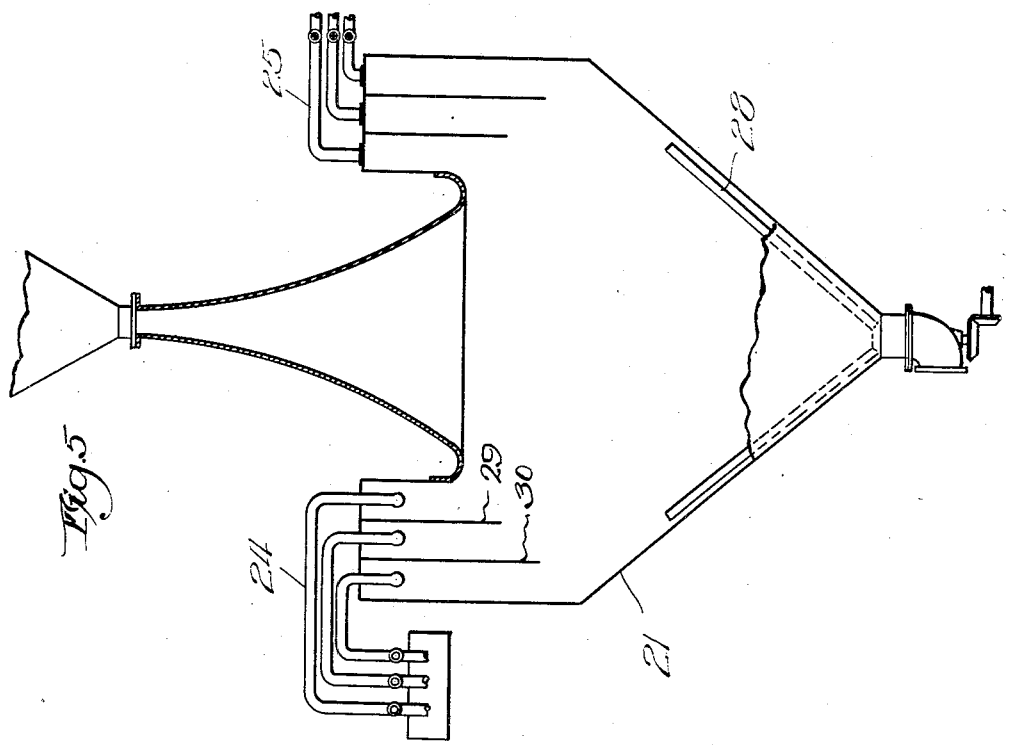
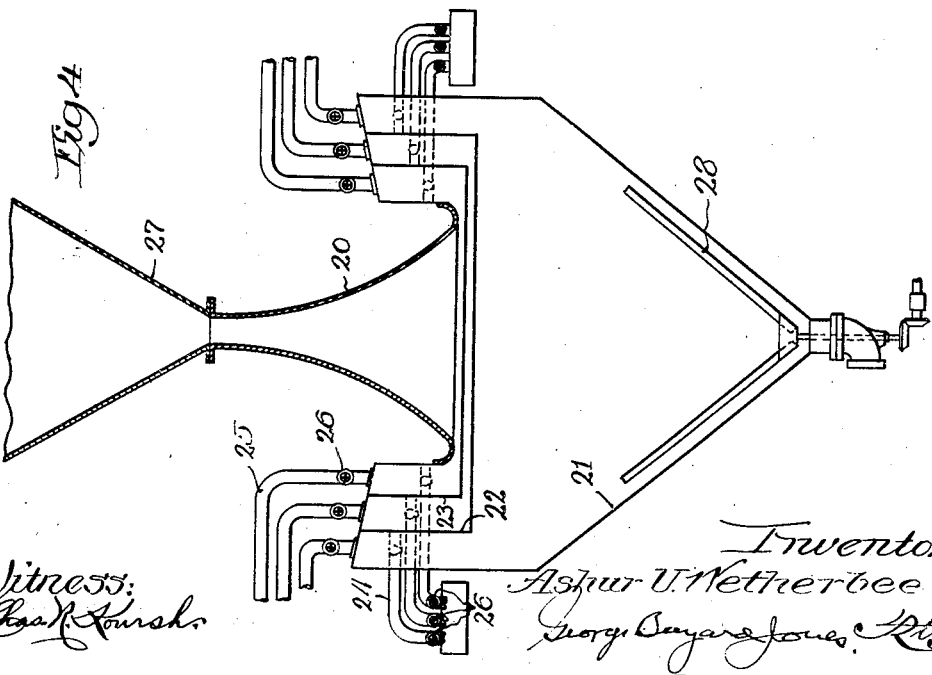

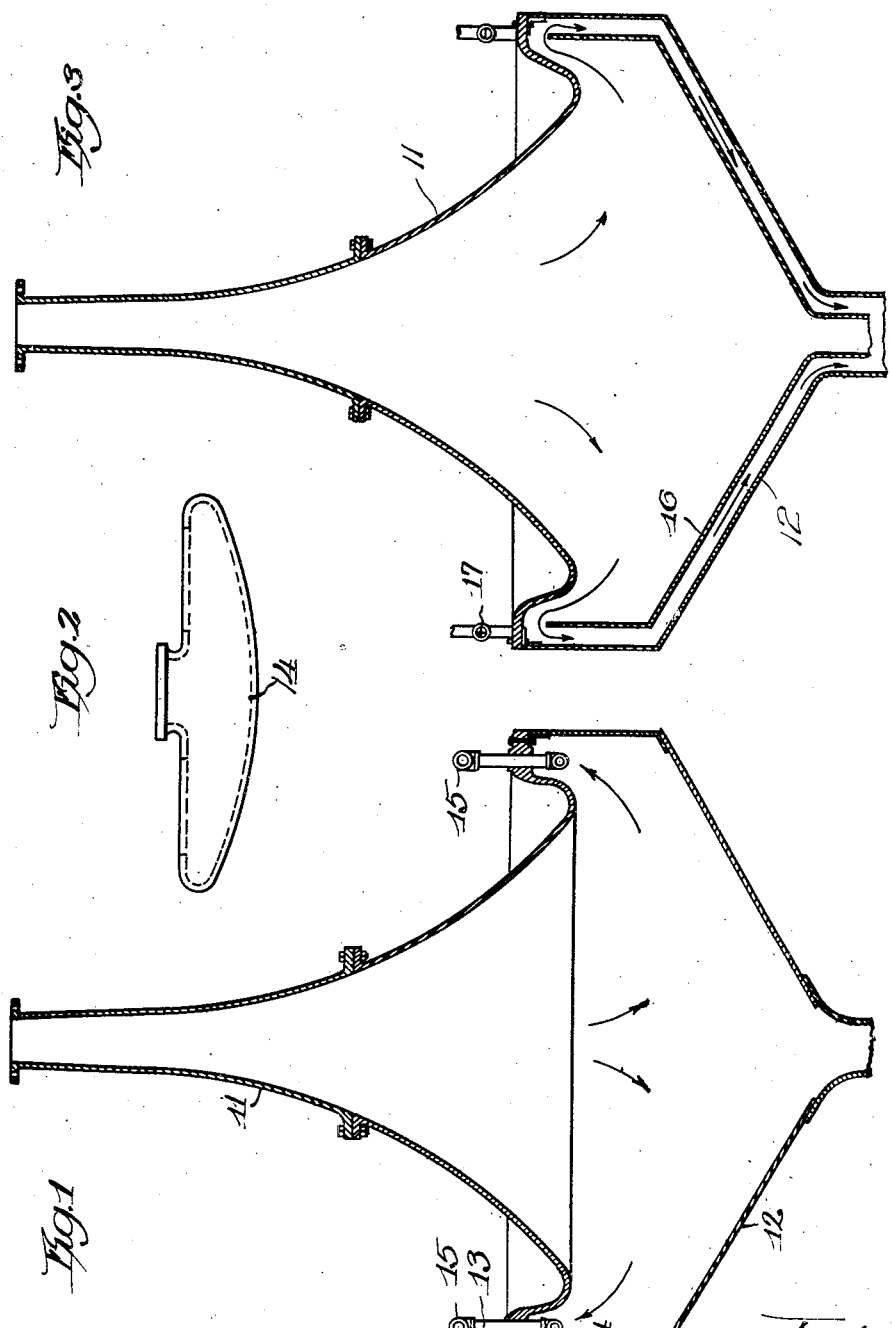

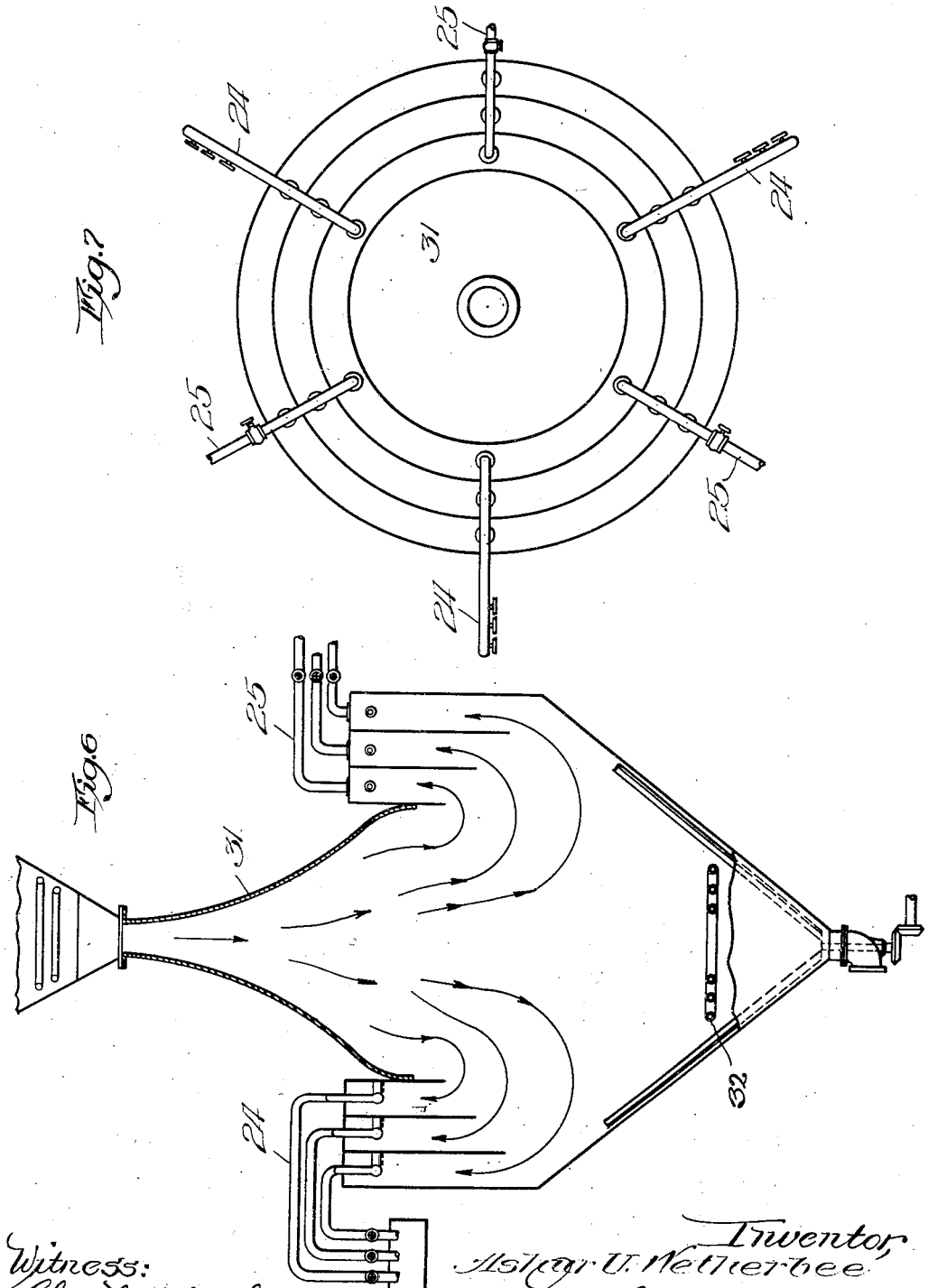

Patented Oct. 29, 1929

1,733,324

UNITED STATES PATENT OFFICE

ASHUR U. WETHERBEE, OF EVANSTON, ILLINOIS, ASSIGNOR TO GILCHRIST & COMPANY, A CORPORATION OF DELAWARE

PROCESS AND APPARATUS FOR DEFECATING LIQUID

Application filed February 16, 1925. Serial No. 9,513.

My invention relates to improvements in processes and apparatus for defeating liquids.

An object of the invention is to provide an improved process whereby a gradually decreasing velocity of the moving body of liquid and a large cross-sectional area of the stream of the liquid are obtained, to permit of the maximum efficiency in settling the sediment.

Another object is to provide a process in which, despite such large reduction in velocity and large settling area of the liquid, the volume thereof and, consequently, the time during which said liquid is held in the receptacle, is a minimum.

A further object is to provide improved apparatus for carrying out the said process.

The process and apparatus are particularly useful in the sugar industry, in which a compartively large amount of juice carrying a small amount of sediment is handled. Said apparatus and process are applicable in various other industries, however.

In the accompanying drawings, I have illustrated several embodiments of the invention.

Fig. 1 is a sectional elevation of one form of the invention.

Fig. 2 is an enlarged elevation of a detail.

Fig. 3 is a sectional elevation of a modification of the lower part of the tank shown in Fig. 1.

Figs. 4, 5 and 6 are further modifications thereof.

Fig. 7 is a plan view of the apparatus of Fig. 6.

The apparatus will be described with reference to defecation as practiced in a raw sugar mill, and the application thereof to other fields will be obvious.

In the process of defecating as now practiced, decanting of the juices is not perfectly accomplished and some of the impurities are carried along with some of the supposedly clear juice. Due to subsequent additional heating, or due to the effect of storage while the juice is heated, a further precipitate may be formed, which precipitate is small in proportion to the volume of the juice, The apparatus in Fig. 1 is particularly effective for removing such comparatively small volumes of sediment prior to the entry of the juice into the evaporating system. Said apparatus comprises preferably a closed tank, as the juice may be heated above the boiling point. The upper part of said tank 11 is preferably in the form of a flaring nozzle or horn, that is a conduit with a comparatively small inlet at the upper end and a body which diverges outwardly, providing a greatly enlarged lower outlet. The lower part 12 of the tank is preferably of general conical shape with a cylindrical upper extension, and is suitably connected to the upper part 11. The clear liquid is drawn off through a series of outlets which may be in the form of pipes 13 arranged at intervals near the outer periphery of the tank, as shown. The lower ends of said pipes may have suction heads 14 and the upper ends connect with suitable draw-off pipes 15. The liquid to be clarified enters through the small inlet at the top of the funnel and the sediment is drawn off through the opening at the bottom of the apparatus.

As the liquid descends through the chamber thus provided, it will be seen that its cross-sectional area increases progressively, thereby rapidly reducing the rate at which the liquid flows toward the bottom of the funnel shaped enclosure until it is reduced to a minimum. The curvature of the sidewalls is preferably such as to prevent the formation of eddy currents, and, in general, to avoid agitation of any kind as much as possible. As the liquid follows the outward curve of the container, the direction of flow becomes gradually horizontal, resulting in a further decrease in velocity due to its outward radial movement, in addition to the fact that the horizontal cross-sectional area of the container is a maximum near the outlets 14.

As the liquid is moving downwardly from the narrow inlet and spreading outwardly, the sediment descends to the bottom of the tank and is not retarded in the same proportion as the liquid, due to the fact that it has a greater density than the liquid and also greater inertia. The radial outward movement of the liquid, representing the maximum change in the direction of flow, thereof, occurs at points where the velocity of said liquid is the minimum, thus interfering the least with the descending sediment and resulting in a very minimum tendency to stir up said sediment and cause it to be resuspended. Also the said sediment tends to fall in a fairly compact stream near the center of the chamber so that the portion of the liquid which is moving radially outward is not required to pass through the descending column of sediment to any appreciable extent. The acceleration due to gravity, acting on said sediment, also serves to keep these particles in a more nearly vertical line than the body of liquid, which completely fills the receptacle. Any sediment which may be carried into that portion of the tank where the direction of motion is horizontal will tend to settle from this slowly moving liquid through the action of gravity and will descend along the conical bottom to the center outlet. The amount of clear liquid drawn off may of course be regulated to prevent too strong a current in the tank. The multiplicity of outlets permits a substantially uniform distribution of the flow toward the periphery of the tank.

In Fig. 3, a slightly modified form of apparatus is shown in which the conical lower part of the tank is provided with a false bottom 16, spaced therefrom, as shown, the upper edge of which provides a horizontal overflow, thereby permitting the clear liquid to be drawn off through the clearance space thus provided, the sediment being drawn off through the central opening at the bottom of said false bottom. With this arrangement, the draw-off pipe at the bottom is restricted or regulated by suitable means so that the outside channel between the two bottoms may be maintained full of the clear liquid as the latter is slowly drawn off. A series of suitable vents may be provided for drawing off scum or releasing air or other gases.

The operation of the apparatus of Fig. 4 is similar to that just described. In this modification the upper part of the tank 20 increases rapidly in cross-sectional area from top to bottom, and the lower half 21 or conical tank is of a very large capacity with steeper sides than those heretofore shown. A number of circular partitions 22 and 23 may be provided, arranged preferably concentrically with reference to the main axis of the tank, said partitions forming separate chambers dividing the flow of liquid into a plurality of independent streams after they pass through the horizontal portion. With the arrangement shown, the streams flow upwardly, but their course could be diverted horizontally outward or diagonally upward or downward, as desired. Each chamber may have independent draw-off pipes 24 and independent pipes 25 for drawing off scum, both sets of pipes being controlled by suitable valves 26, or a common scum draw-off for all the chambers may be provided. The liquid may be introduced into the tank through a funnel 27 constituting a scum tank used for the removal of most of the scum as a preliminary operation.

In the conical tank 21, suitable mechanical means, such as scrapers 28 may be employed to assist in removing the sediment through the bottom opening. Similar mechanical means may also be applied to the apparatus shown in Figs. 1 and 3, if necessary, and in Fig. 3 the scrapers may be located between the double bottoms or inside the inner bottom, or in both locations depending on the purpose for which the apparatus is used.

The apparatus shown in Fig. 5 is similar to that shown in Fig. 4, except that the partitions 29 and 30 are of different lengths, whereby the outer partition extends farther down into the tank than the inner one, thereby drawing off the clear liquid from different vertical zones as it flows horizontally outward. This causes part of the liquid to descend lower in the tank before acquiring a horizontal flow than would otherwise be the case. In other words, the outwardly horizontally flowing liquid has a greater depth by virtue of this arrangement. In both forms of the tanks described, the number of partitions may be varied in accordance with the demands of the service required and the arrangement and location of the draw-off pipes for the liquid and for the scum may likewise be varied. In Fig. 5 the two sets of pipes are preferably distributed evenly around the circumference of the tank.

In Fig. 6 the upper part of the tank is shown with a somewhat different curvature, the cross-section showing a reverse curve as suggesting one of a number of possible modifications.

In all of the different forms of tanks illustrated, suitable means may be provided for heating or cooling the liquid, or otherwise regulating its temperature. Such heating means may be located within or without the tank. Among other well known means for regulating the temperature, coils 32, such as shown in Fig. 6, may be provided. Also with the temperature controlling means within the tank, the outer walls may be provided with heat insulating material, if necessary.

The curvature of the upper part of the tank may vary within wide limits, but is preferably made to assume geometrical forms following algebraic equations or formulæ. The general shape of the tanks, in the forms shown, is advantageous, particularly above the point where the liquid is drawn off, in that there is no large cubical content ineffective or unused. In other words, the volume of the liquid held in the tank and the time that it is held therein are reduced to a minimum. Where the sediment is formed by chemical reaction, such reaction may take place within or without the tank. Also two or more tanks may be connected in series to effect a progressive removal of sediment, or said tanks may be connected in any other suitable combination, or in combination with other clarification apparatus. Where the tanks are closed, as in the forms illustrated, the temperature and the pressure may be raised above what would be feasible in connection with an open tank, although the use of open tanks is contemplated. The tank may be used as a thickener, that is it may be desired to save the heavier product, or in fact both of the segregated products.

The apparatus disclosed herein may be used not only in the sugar industry, but very widely in other arts, as, for example, in connection with water softeners, the mining industry, sewage treatment and chemical industries generally.

Various changes other than those suggested herein may be made in the apparatus without departing from the spirit of the invention as expressed in the appended claims.

What I claim as new is:

1. A defecator comprising an inverted horn-shaped upper portion, a conical lower portion, a cylindrical middle portion having outlets therein, and partitions in said cylindrical portion to direct the clear liquid to said outlets through independent chambers.

2. The process of defecating liquid which consists in admitting said liquid centrally to an outwardly flaring downwardly extending chamber, causing the downward velocity of said liquid to be greatly retarded by gradually yet greatly increasing the cross-sectional area of the downwardly flowing liquid and near its point of slowest downward movement causing a horizontal outward thence upward flow of the liquid to facilitate the settling of the sediment therefrom.

3. In a defecator for separating a liquid from matter suspended therein, a settling compartment having a collecting surface and passage for the collection and removal of settled matter, a superposed flow chamber having a relatively small inlet near its upper end and having a relatively large outlet at its lower end in open communication with said compartment, the chamber having diverging walls providing horizontal internal cross-sectional areas gradually and progressively increasing from its upper end to said outlet, the compartment having annularly arranged liquid discharge means adjacent the bottom of said walls for drawing the liquid radially from the chamber, the chamber and discharge means being adapted to cause the descending stream of liquid to gradually decrease in vertical velocity and to flow radially without turbulence therein, the angle of divergence of the walls being so great for a substantial vertical distance of the chamber that the horizontal diameter of the chamber increases faster than the height within said distance.

4. In a defecator, a chamber having an inlet wall downwardly diverging from the chamber inlet and forming a flow space gradually increasing in cross-sectional area from said inlet to the chamber outlet, and a clarified liquid outlet annularly disposed and radially outside of and immediately adjacent the lower end of said walls below said inlet, the walls diverging gradually and smoothly from the inlet to the outlet to prevent the formation of eddy currents in a liquid flowing slowly from said inlet to said outlet.

5. A defecator for clarifying a liquid carrying suspended matter comprising a chamber having an inlet and an outlet, and walls diverging in a continuous curve from said inlet to said outlet, the inlet being centrally disposed well above the level of the lower edge of said walls, the outlet being annularly disposed in the defecator approximately at the level of the lower edge of said walls to thereby cause the liquid to flow downwardly with decreasing velocity from the inlet to the outlet without appreciable formation of eddy currents.

6. In a defecator for separating a liquid from matter suspended therein, a chamber having an upper central inlet and having annularly disposed liquid discharge means below and radially outside of the inlet, said chamber having walls gradually diverging continuously from the inlet to points adjacent said liquid discharge means, and a compartment below said chamber for collecting the settled matter, the walls being adapted to induce greater radial movement than downward movement of the liquid in a substantially large lower portion of the chamber without formation of eddy currents which might interfere with separation of the settling matter from the clarifying liquid.

7. The process of removing suspended matter from a liquid comprising causing a general downward flow of the liquid initially in a relatively small stream, gradually increasing the horizontal cross-sectional area of the stream as it progresses downwardly, progressively decreasing the downward velocity of the liquid in the stream, gradually increasing the extent of the radial expansion of the stream without creating turbulence in the stream, continuing the downward and radial flow of the liquid until a relatively large stream is obtained, removing the clarified liquid radially from the stream in independent channels from several points at different radial distances from the center of the stream.

8. A defecator tank comprising a flow chamber having an upper inlet and continuously diverging walls extending downwardly from said inlet, outlets located in the tank adjacent to and approximately at the level of the lowermost portion of said chamber for conducting the clarified liquid from the tank, the lowermost portions of said walls being extended downwardly thence outwardly into proximity to said outlets, and a sediment collecting compartment below and connected to said flow chamber having a port in its lowermost portions for discharging sediment.

9. A defecator tank comprising a flow chamber having an upper inlet and continuously diverging walls extending downwardly from said inlet, outlets located in the tank adjacent to and approximately at the level of the lowermost portion of said chamber for conducting the clarified liquid from the tank, the lowermost portions of said walls being extended downwardly thence outwardly into proximity to said outlets, and a sediment collecting compartment below and connected to said flow chamber having a port in its lowermost portions for discharging sediment, said compartment and chamber being connected at their peripheries to form a closed tank open only at said inlet, said outlets and said port.

10. A defecator tank comprising a flow chamber having an upper inlet and continuously diverging walls extending downwardly from said inlet, outlets located in the tank adjacent to and approximately at the level of the lowermost portion of said chamber for conducting the clarified liquid from the tank, the lowermost portions of said walls being extended downwardly thence outwardly into proximity to said outlets, and a sediment collecting compartment below and connected to said flow chamber having a port in its lowermost portions for discharging sediment, said compartment and chamber being connected at their peripheries forming a closed tank adapted to contain liquid only within said chamber and within said compartment below said chamber and said outlets.

In testimony whereof, I have subscribed my name.

ASHUR U. WETHERBEE.